(12) United States Patent
Shih

(10) Patent No.: US 9,407,198 B2
(45) Date of Patent: Aug. 2, 2016

(54) SUPPORT STRUCTURE FOR SOLAR PANEL

(71) Applicant: Skylight Energy International Inc., Taoyuan (TW)

(72) Inventor: Shou-Jen Shih, Taoyuan (TW)

(73) Assignee: Skylight Energy International Inc., Taoyuan (TW)

( * ) Notice: Subject to any disclaimer, the term of this patent is extended or adjusted under 35 U.S.C. 154(b) by 0 days.

(21) Appl. No.: 14/682,839

(22) Filed: Apr. 9, 2015

(65) Prior Publication Data

US 2015/0340986 A1 Nov. 26, 2015

(30) Foreign Application Priority Data

May 20, 2014 (TW) .............................. 103117700 A

(51) Int. Cl.
*H02S 20/23* (2014.01)
*F24J 2/52* (2006.01)
*E04D 13/04* (2006.01)
*H02S 20/26* (2014.01)

(52) U.S. Cl.
CPC ............ *H02S 20/23* (2014.12); *E04D 13/0445* (2013.01); *F24J 2/5207* (2013.01); *F24J 2/5258* (2013.01); *H02S 20/26* (2014.12); *E04D 2013/045* (2013.01); *Y02B 10/10* (2013.01); *Y02E 10/47* (2013.01)

(58) Field of Classification Search
CPC ....... F24J 2/5207; F24J 2/5209; F24J 2/5211; F24J 2/5262; F24J 2/4614; F24J 2002/5226; H02S 30/10; H02S 20/23; H02S 20/26; E04D 13/0445; E04D 2013/045
See application file for complete search history.

(56) References Cited

U.S. PATENT DOCUMENTS

| | | | | | |
|---|---|---|---|---|---|
| 3,844,087 | A | * | 10/1974 | Schultz | ..................... E04D 3/08 52/200 |
| 4,449,341 | A | * | 5/1984 | Taglianetti | ................ E04B 2/88 52/235 |
| 4,455,798 | A | * | 6/1984 | Tsakiris | ..................... E04D 3/08 403/174 |
| 4,638,613 | A | * | 1/1987 | Tonsmann | ................ E04B 1/24 52/200 |
| 4,680,905 | A | * | 7/1987 | Rockar | ..................... E04D 3/08 52/200 |
| 4,850,167 | A | * | 7/1989 | Beard | ................... E04B 1/0046 52/14 |

(Continued)

FOREIGN PATENT DOCUMENTS

CN    201671250 U      12/2010
EP     2626651 A1  *   8/2013

(Continued)

OTHER PUBLICATIONS

Office Action of corresponding TW application, published on Jan. 20, 2016.

*Primary Examiner* — Robert Canfield
(74) *Attorney, Agent, or Firm* — Wang Law Firm, Inc.

(57) ABSTRACT

A support structure for solar panel includes first supports, second supports, first platens, second platens, and optoelectronic units. Two first diversion grooves are formed in an upper part of the top protrusion, and second diversion grooves are respectively formed in the side protrusions. One end of the second support is connected to one side of the first support, and the third diversion grooves is formed in an upper part of each second support. The first platen is disposed on the upper part of the first support. The second platen is disposed on the upper part of the second support. The optoelectronic unit is disposed between the first platen and the first support, and is disposed between the second platen and the second support.

8 Claims, 7 Drawing Sheets

(56) References Cited

U.S. PATENT DOCUMENTS

| | | | | |
|---|---|---|---|---|
| 4,918,882 A | * | 4/1990 | Funk | E04B 1/0046 52/200 |
| 4,974,385 A | * | 12/1990 | McFadden | E04D 3/08 403/189 |
| 5,092,087 A | * | 3/1992 | Kane | E04D 3/06 52/14 |
| 5,121,583 A | * | 6/1992 | Hirai | F24J 2/045 52/173.3 |
| 8,191,321 B2 | * | 6/2012 | McClellan | E04D 13/0445 126/623 |
| 8,341,900 B2 | * | 1/2013 | Reyal | F24J 2/4614 52/173.3 |
| 2010/0132274 A1 | * | 6/2010 | Reyal | F24J 2/4614 52/173.3 |
| 2011/0138711 A1 | * | 6/2011 | Seng | F24J 2/5207 52/173.3 |
| 2011/0302857 A1 | * | 12/2011 | McClellan | E04D 13/0445 52/173.3 |

FOREIGN PATENT DOCUMENTS

| | | | |
|---|---|---|---|
| JP | 2014185513 A | * | 10/2014 |
| TW | M443839 U1 | | 12/2012 |

* cited by examiner

SUPPORT STRUCTURE FOR SOLAR PANEL

CROSS-REFERENCE TO RELATED APPLICATION

This application claims priority to Taiwan Patent Application No. 103117700, filed on May 20, 2014, in Taiwan Intellectual Property Office, the contents of which are hereby incorporated by reference in their entirety for all purposes.

BACKGROUND OF THE INVENTION

1. Field of the Invention

The exemplary embodiment(s) of the present invention relates to a field of support structure for solar panel, in particular to a support structure for solar panel that plurality of diversion grooves are formed therein.

2. Description of the Related Art

Along with the raising in awareness of environmental protection and the emerging of anti-nuclear issues, the effective usage of alternative energy for decreasing environmental damages due to existing ways will be the most facing-problem around the world.

Further, given the sufficient sunshine hours in tropical area and subtropical area, solar power productivity could be elevated. In general, solar panels are arranged on building rooftops to get the most utilization of radiation area for subsequent power generation.

Building integrated photovoltaics (BIPV) is an application that replaces traditional building material with solar photovoltaic materials, and makes the building itself a huge energy source without addition solar panels installation. Since the installation of BIPV is taken into consideration at the very beginning of design stages, the ratio of electricity-generating rate to building cost may be optimized, in which, skylights and facades are usually most significant light-receiving surface.

On the other hand, given the fact that the great amount of rainfall and torrential rain suddenly occurs on coastal areas in tropics and subtropics, if BIPV were applied to construct buildings in those regions, in which solar panels become rooftop and facades, related waterproof issue will be apparently important. However, corresponding waterproof structure designs are not available in the skill of BIPV art, resulting in the problem of the present solar panel structure that raindrops penetrate into interior of the building.

Therefore, it is a primary objective of the present invention to provide a solar support that embraces solar power panel constructs while preventing the rain from penetrating into the inside of the building.

SUMMARY OF THE INVENTION

In view of the shortcomings of the prior art, it is a primary objective of the present invention to provide a support structure for solar panels to solve the penetrating problem of falling rain, in which plurality of diversion grooves are formed, such that, falling rain would be diverted away.

To achieve the aforementioned objective, the present invention provides a support structure for solar panel, comprising a plurality of first supports, a plurality of second supports, a plurality of first platens, a plurality of second platens, and a plurality of optoelectronic units. The plurality of first supports comprise a top protrusion and two side protrusions, with two first diversion grooves are formed in an upper part of the top protrusion and a second diversion groove are formed in each of the side protrusions by denting along both sides of the top protrusion toward the side protrusions. The plurality of second supports are respectively disposed between two of the plurality of first supports, with a third diversion groove is formed in an upper part of each of the plurality of second supports. The plurality of first platens respectively cover the upper part of each of the top protrusions. The plurality of second platens respectively cover the upper part of each of the plurality of second supports. The plurality of optoelectronic units are respectively disposed between two of the plurality first supports and two of the plurality of second supports, and disposed between each of the plurality of first platens and each of the plurality of first supports, and disposed between each of the plurality of second platens and each of the plurality of second supports.

Preferably, a base may be disposed on a bottom part of each of the plurality of first supports, and an accommodating space may be formed therebetween.

Preferably, the support structure for solar panel may further comprise a fire protection layer that is disposed in the accommodating space.

Preferably, the base and the corresponding first support may be integrally formed.

Preferably, the base may be connected to the corresponding first support with at least one connector.

Preferably, a gap may be formed between an end of each of the plurality of second supports and each of the plurality of first supports that is adjacent to the second support.

Preferably, the third diversion groove may be in communication with the second diversion groove that is adjacent to the third diversion groove through the gap.

Preferably, a waterproof strip may be disposed between each of the first platens and each of the optoelectronic units.

Preferably, the waterproof strip may be disposed between the upper part of each of the second supports and each of the optoelectronic units.

Preferably, the support structure for solar panel may further comprise at least one connecting sleeve, connecting between two neighboring ones of the first supports.

The support structure for solar panel provided in the preset invention has one ore more of the following advantages. The support structure for solar panel provided in the preset invention may divert away water-drops that may penetrate into the first platen and the optoelectronic unit out, through the first diversion groove of the first support. The support structure of the present invention may divert the penetrated drops between the second platen and the optoelectronic unit to the second diversion groove through the gap by utilizing the third diversion groove, then divert the water drops away through the second diversion groove. By completely diverting out the penetrated drops, it prevents water drops from flowing into interior of the building.

DESCRIPTION OF THE PREFERRED EMBODIMENTS

Exemplary embodiments of the present invention are described herein in the context of a support structure for solar panel.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

Figure 1:
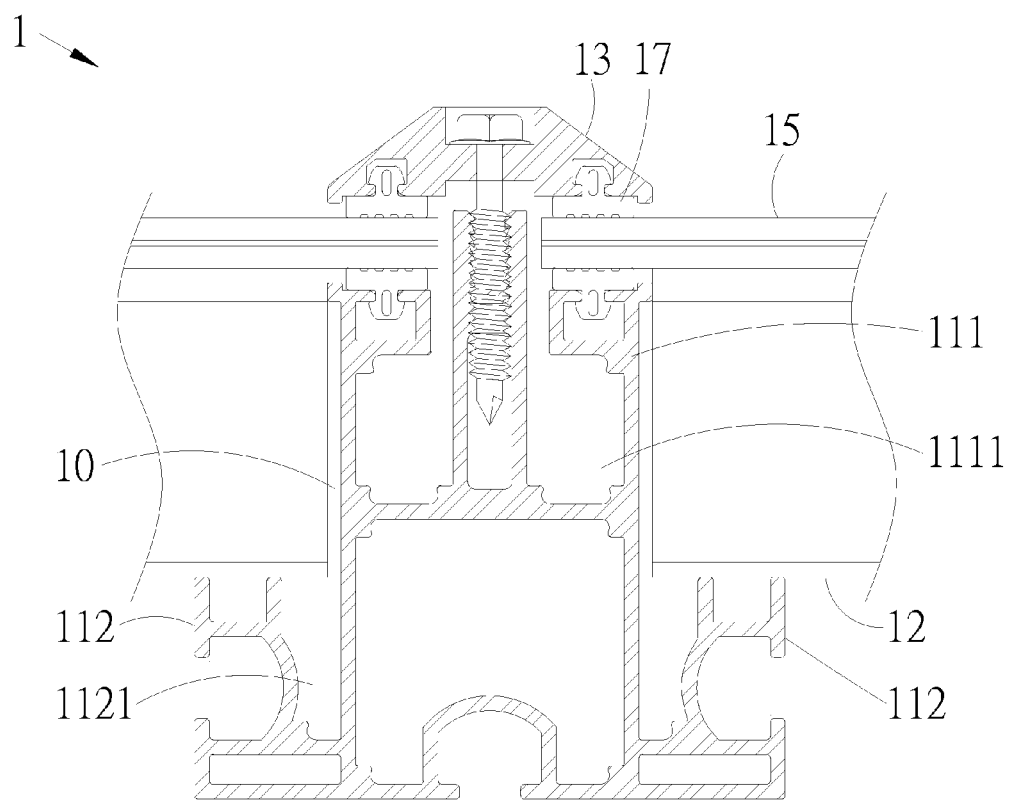
FIG. 1 is a cross-sectional view of the support structure for solar panel of the present invention.
Figure 2:
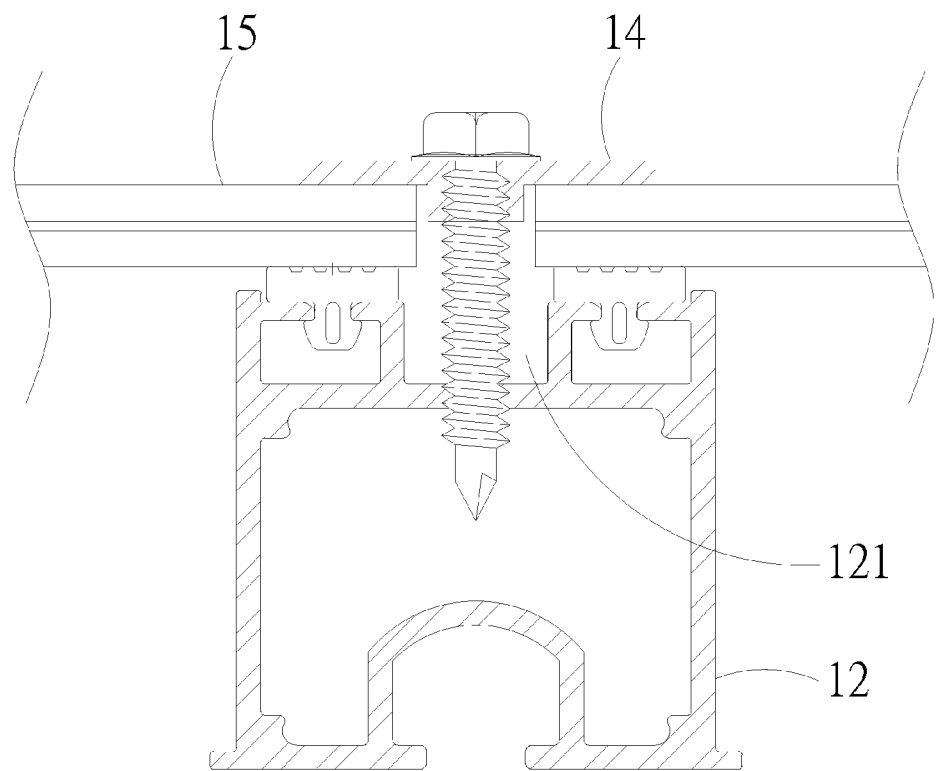
FIG. 2 is a cross-sectional view of the second support and the second platen of the support structure for solar panel of the present invention.

With reference to FIG. 1 and FIG. 2, in which FIG. 1 is a cross-sectional view of the support structure for solar panel of the present invention and FIG. 2 is a cross-sectional view of the second support and the second platen of the support structure for solar panel of the present invention. As shown in the figures, the support structure for solar panel 1 of the present invention comprises a plurality of first supports 11, a plurality of second supports 12, a plurality of first platens 13, a plurality of second platens 14, and a plurality of optoelectronic units 15.

Additionally, each of the plurality of first supports 11 includes a top protrusion 111 and two side protrusions 112, wherein two first diversion grooves 1111 are formed in an upper part of the top protrusion 111, and second diversion grooves 1121 are respectively formed in the side protrusions 112 by denting along both sides of the top protrusion 111 toward the side protrusions 112. The plurality of second supports 12 are disposed respectively between the two of the plurality of first supports 11, and a third diversion groove 121 is formed in an upper part of each second support 12. Each of the plurality of first platens 13 covers on the upper part of each top protrusion 111. The plurality of second platens 14 respectively cover the upper part of each second support 12. The plurality of optoelectronic units 15 are respectively disposed between the two of the plurality first supports 11 and two of the plurality of second supports 12, and disposed between each first platen 13 and each first support 11, and positioned between each second platen 14 and each second support 12.

When a support structure for solar panel 1 of present invention is in actual practice, the two of the plurality of first supports 11, two of the plurality of second supports 12 and one optoelectronic unit 15 are assembled to be a basic component. In more detail, the two of the plurality of first supports 11 are parallel to each other, and the two of the plurality of second supports 12 are also parallel to each other, and meanwhile disposed between the two of the plurality of first supports 11. One end of each second supports 12 are disposed on one side protrusion 112 of the one of the two first supports 11, and lean against the side protrusion 112, and the other end of each second supports 12 are disposed on one side protrusion 112 of the other first supports 11, and lean against the side protrusion 112 as well.

Further, after installation of each first support 11 and each second support 12, the optoelectronic unit 15 is placed in the region that is surrounded by two of the plurality of first supports 11 and two of the plurality of second supports 12, and the optoelectronic unit 15 is disposed on the upper part of the top protrusion 111 of each first support 11 and the upper part of each second support 12.

Then, the first platen 13 that corresponds to the first support 11 is disposed above the optoelectronic unit 15. The second platen 14 that corresponds to the second support 12 is disposed above the optoelectronic unit 15. Further, optoelectronic unit 15 is interposed between the first platen 13 and the first support 11, and between the second platen 14 and the second support 12.

Figure 3:
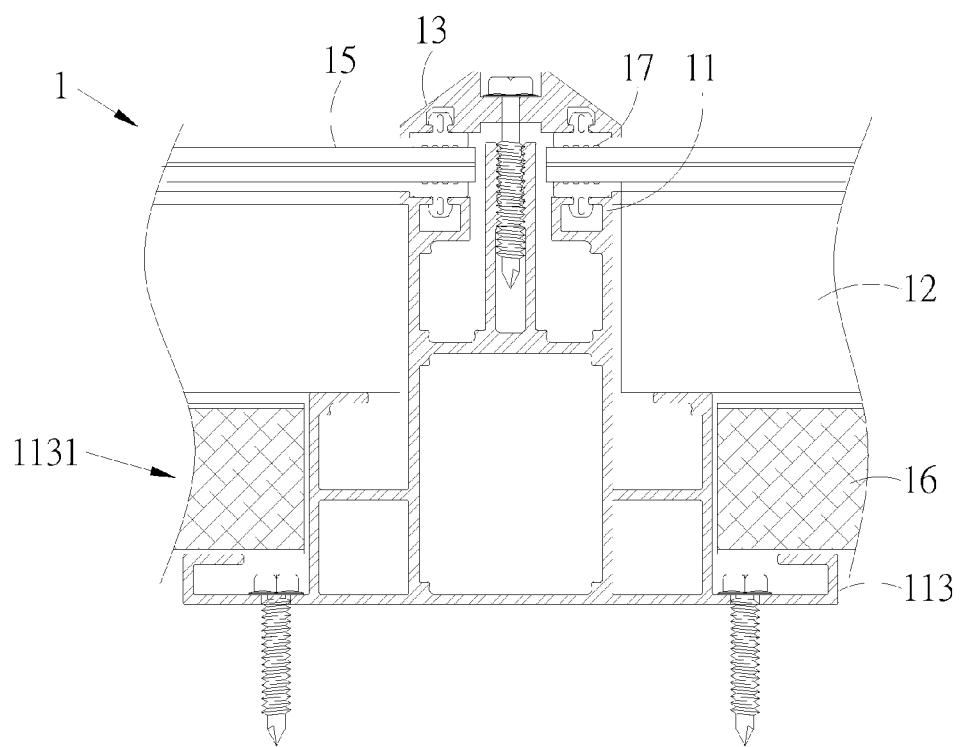
FIG. 3 is another cross-sectional view of the support structure for solar panel of the present invention.
Figure 4:
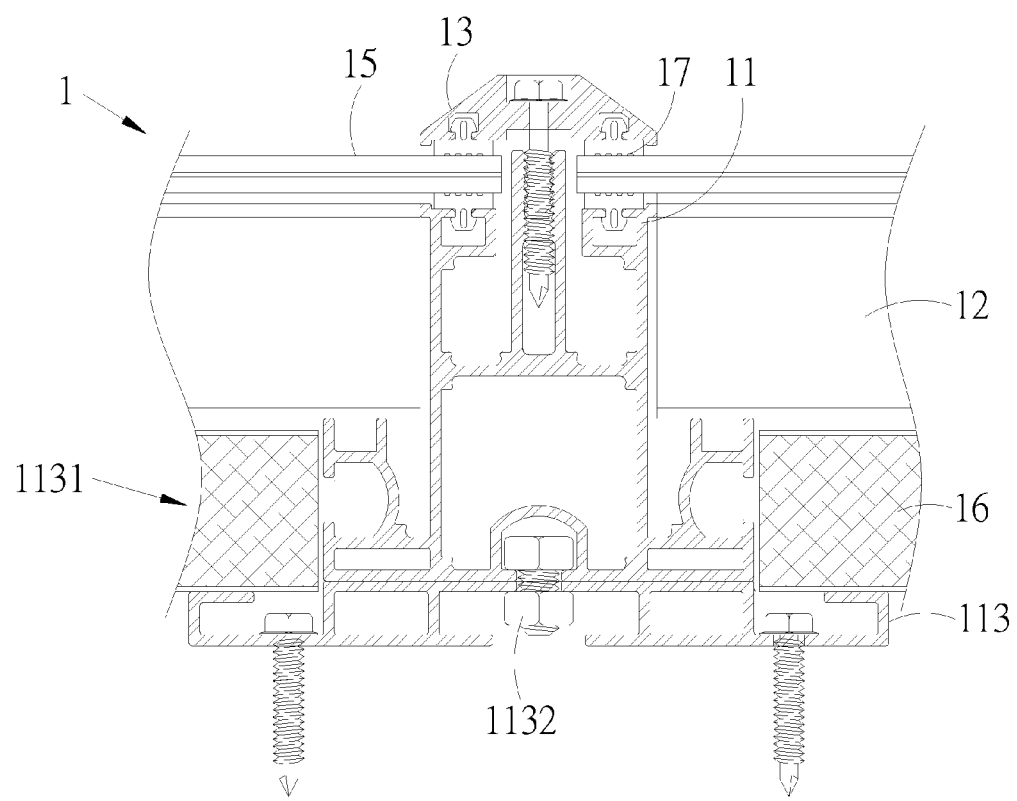
FIG. 4 is still another cross-sectional view of the support structure for solar panel of the present invention.

With reference to FIG. 3 and FIG. 4, in which FIG. 3 is another cross-sectional view of the support structure for solar panel of the present invention, and FIG. 4 is still another cross-sectional view of the support structure for solar panel of the present invention. As shown in the figures, in accordance with the support structure for solar panel 1 of the present invention, a base 113 is disposed on a bottom part of the first support 11, and an accommodating space 1131 is formed between the base 113 and each second support 12.

Moreover, the support structure for solar panel 1 of the present invention may further include a fire protection layer 16, and the fire protection layer 16 is disposed in the aforementioned accommodating space 1131. More precisely, the fire protection layer 16 is disposed in the accommodating space 1131 which is surrounded by the bottom face of each second support 12, the side face of the side protrusion 112, and the top face of the base 113. In addition to the fire protection layer 16, there may be some other layered structures made from other materials (e.g., iron sheet, wood plank, etc.) disposed in the accommodating space 1131.

It is worth noting that the aforementioned base 113 abovementioned and the corresponding first support 11 could be integrally formed (as shown in FIG. 3). Or, the base 113 may be an individual member, which could be connected to the corresponding first support 11 with a connector 1132 (fixing by screws, as shown in FIG. 4). The invention is not limited to these arrangements only, but any equivalents can be adopted.

In addition, after assembling of each first support 11 and each second support 12, a gap 10 could be formed between each end of the second support 12 and one side of the first support 11 that is adjacent to the second support 12. Moreover, the third diversion groove 121 could communicate with the adjacent second diversion groove 1121 through the gap 10.

Figure 7:
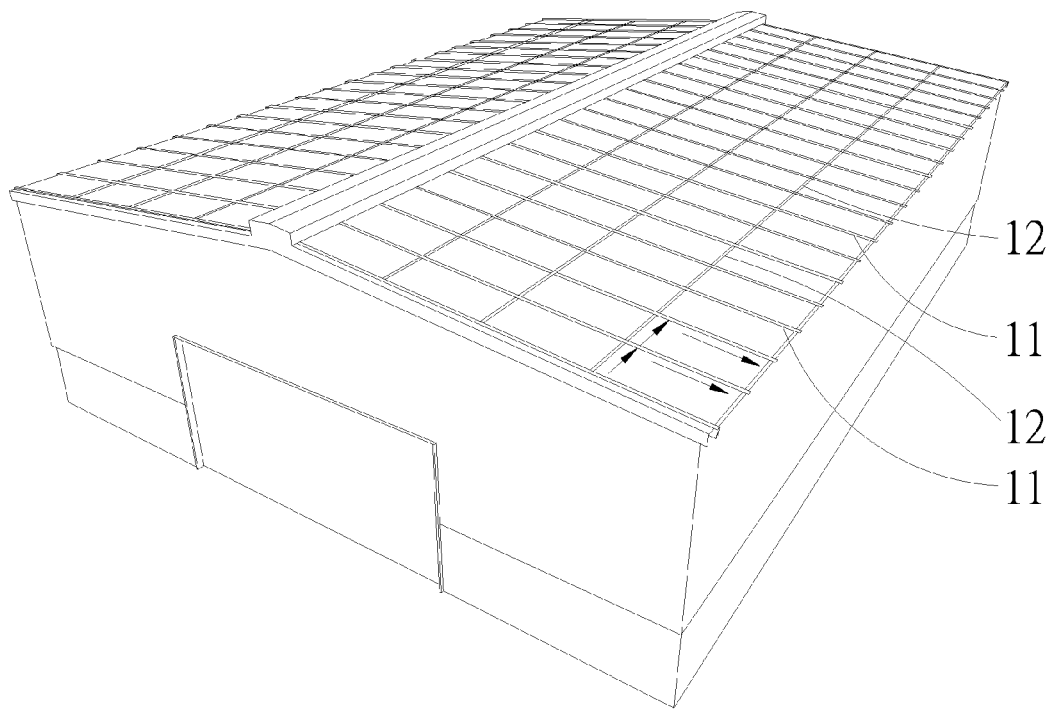
FIG. 7 is an application schematic view of the support structure for solar panel of the present invention.

With reference to FIG. 7, which is an application schematic view of the support structure for solar panel of the present invention. With reference to directions of arrows in the figure, which represent the fashion of diversion, when water drops penetrate inside from the second platens 14 and the optoelectronic units 15 there between, water drops will be penetrated into the third diversion grooves 121 firstly, then be diverted by the third diversion grooves 121, and flow into the second diversion grooves 1121 through gaps 10. Finally, the water drops will be diverted out through second diversion grooves 1121. Meanwhile, water drops penetrated from the first platens 13 and the optoelectronic units 15 may penetrate into the first diversion grooves 1111, and then be diverted out through first diversion grooves 1111.

In addition, although the support structure for solar panel 1 of the present invention has the design that comprises the first diversion grooves 1111, the second diversion grooves 1121 and the third diversion grooves 121, it is still necessary to prevent water as much as possible from penetrating into the first platens 13 and the optoelectronic units 15, or from penetrating into the second platens 14 and the optoelectronic units 15 there between. For this reason, a water proof strip 17 could be disposed between the first platen 13 and the optoelectronic unit 15. Further, a water proof strip 17 could be disposed between the upper part of the second support 12 and the optoelectronic unit 15.

The aforementioned arrangements are only exemplary; the water proof strip 17 could also be disposed between the optoelectronic unit 15 and the upper part of the top protrusion 111 of the first support 11, and between the optoelectronic unit 15 and the second platen 14.

Figure 5:
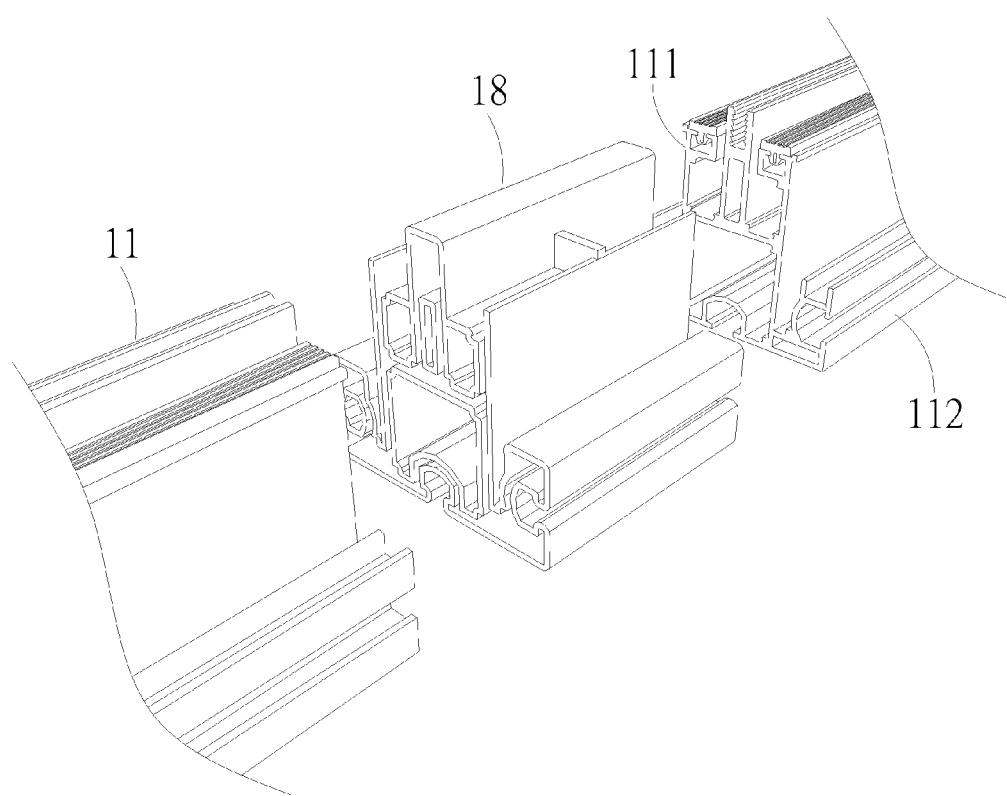
FIG. 5 is an exploded view of the first support and the connecting sleeve of the support structure for solar panel of the present invention.
Figure 6:
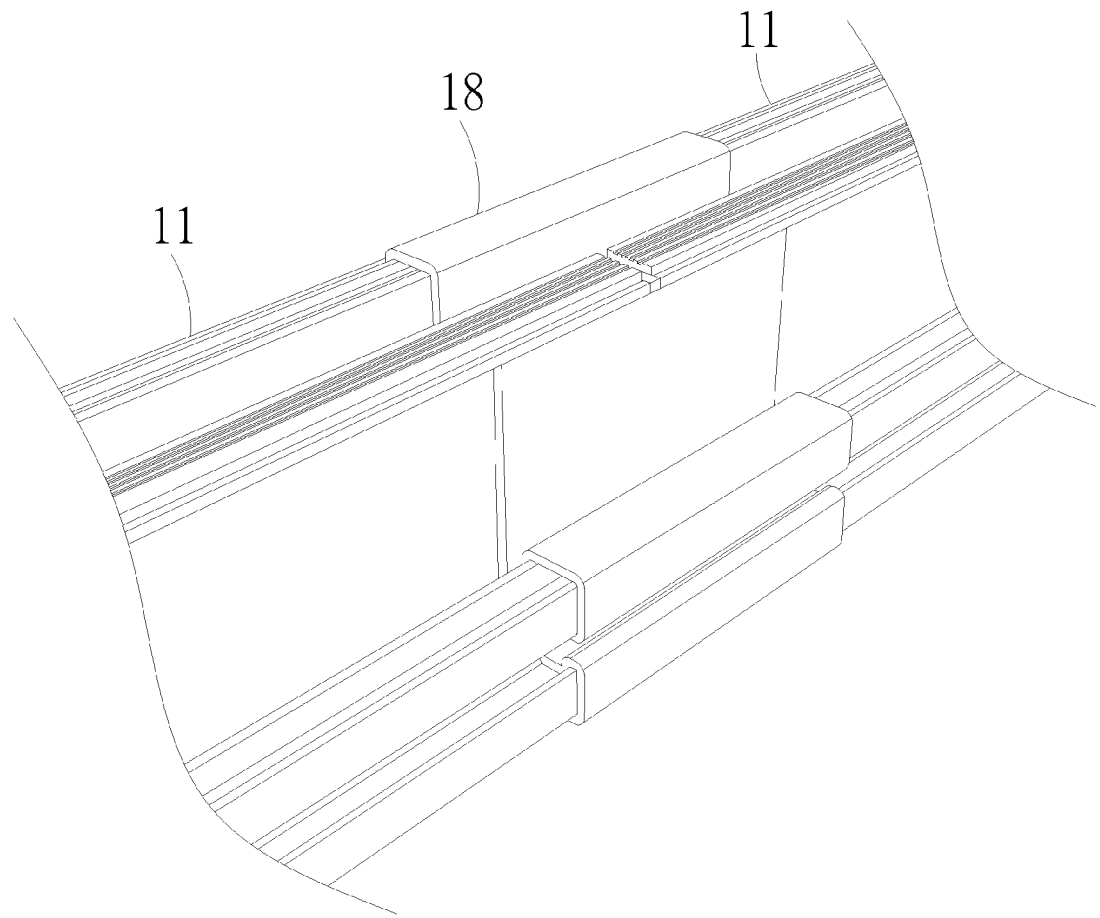
FIG. 6 illustrates the assembled first support and the connecting sleeve of the support structure for solar panel of the present invention.

With reference to FIG. 5 and FIG. 6, in which FIG. 5 is an exploded view of the first support and the connecting sleeve of the support structure for solar panel of the present invention, and FIG. 6 is illustrate the assembled first support and the connecting sleeve of the support structure for solar panel of the present invention. As shown in the figures, given the limitation of manufacturing processes and other consideration, the first support 11 of the support structure for solar panel 1 is supposed to have a maximum length limitation. When the length of the first support 11 needs to be longer than the maximum length limitation, two or more first supports 11 should be connected as one. Nevertheless, considering the facts that the possibility of water penetrating from the junction when two or more first supports 11 are connected, a connecting sleeve 18 is further required to make the plurality of first supports 11 connect one by one. Hence, both ends of the connecting sleeve 18 are attached to one end of the first support 11 and one end of another first support 11, respectively. It is worthy to note that, by the arrangement of connecting sleeves 18, water which penetrates into the first diversion grooves 1111 or second diversion grooves 1121 could easily flow from one of the plurality of first supports 11 to which the other first support 11 is connected by passing through the interior of the connecting sleeve 18.

From the abovementioned explanation, the support structure for solar panel of preset invention could divert out waterdrops that penetrate into the first platen and the optoelectronic unit, through the first diversion groove of the first support; and could divert the penetrated drops between the second platen and the optoelectronic unit to the second diversion groove through the gap by using the third diversion groove, then divert out water drops through the second diversion groove. By completely diverting out of penetrated drops, water drops may be prevented from flowing into the interior of the building.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A support structure for solar panel, comprising:
   a plurality of first supports, each comprising a top protrusion and two side protrusions, with two first diversion grooves formed in an upper part of the top protrusion and a second diversion groove formed in each of the side protrusions by denting along both sides of the top protrusion toward the side protrusions;
   a plurality of second supports respectively disposed between two of the plurality of first supports, with a third diversion groove formed in an upper part of each of the plurality of second supports;
   a plurality of first platens respectively covering the upper part of each of the top protrusions;
   a plurality of second platens respectively covering the upper part of each of the plurality of second supports; and
   a plurality of optoelectronic units respectively disposed between two of the plurality first supports and two of the plurality of second supports, and disposed between each of the plurality of first platens and each of the plurality of first supports, and disposed between each of the plurality of second platens and each of the plurality of second supports,
   wherein a base is disposed on a bottom part of each of the plurality of first supports, and an accommodating space is formed between a top face of the base and a bottom face of the each of the plurality of second supports, and a fire protection layer disposed in the accommodating space.

2. The support structure for solar panel of claim 1, wherein the base and the corresponding first support are integrally formed.

3. The support structure for solar panel of claim 1, wherein the base is connected to the corresponding first support with at least one connector.

4. The support structure for solar panel of claim 1, wherein a gap is formed between an end of each of the plurality of second supports and each of the plurality of first supports that is adjacent to the second support.

5. The support structure for solar panel of claim 4, wherein the third diversion groove is in communication with the second diversion groove that is adjacent to the third diversion groove through the gap.

6. The support structure for solar panel of claim 1, wherein a waterproof strip is disposed between each of the first platens and each of the optoelectronic units.

7. The support structure for solar panel of claim 1, wherein a waterproof strip is disposed between the upper part of each of the second supports and each of the optoelectronic units.

8. The support structure for solar panel of claim 1, further comprising at least one connecting sleeve, connecting between two neighboring ones of the first supports.

* * * * *